(12) United States Patent
Zhang

(10) Patent No.: US 11,848,892 B2
(45) Date of Patent: Dec. 19, 2023

(54) METHOD AND DEVICE IN WIRELESS TRANSMISSION

(71) Applicant: Xiaobo Zhang, Shanghai (CN)

(72) Inventor: Xiaobo Zhang, Shanghai (CN)

(73) Assignee: SHANGHAI QIYU COMMUNICATION TECHNOLOGY SERVICE CENTER, Shanghai (CN)

( * ) Notice: Subject to any disclaimer, the term of this patent is extended or adjusted under 35 U.S.C. 154(b) by 0 days.

(21) Appl. No.: 17/695,869

(22) Filed: Mar. 16, 2022

(65) Prior Publication Data

US 2022/0224493 A1     Jul. 14, 2022

Related U.S. Application Data

(63) Continuation of application No. 16/894,874, filed on Jun. 7, 2020, now Pat. No. 11,316,647, which is a
(Continued)

(30) Foreign Application Priority Data

Aug. 12, 2016   (CN) .......................... 201610667979.7
Oct. 21, 2016   (CN) .......................... 201610917646.5

(51) Int. Cl.
*H04L 5/00*          (2006.01)
*H04L 1/1812*      (2023.01)
*H04W 72/0446*    (2023.01)

(52) U.S. Cl.
CPC .......... *H04L 5/0055* (2013.01); *H04L 1/1812* (2013.01); *H04W 72/0446* (2013.01)

(58) Field of Classification Search
None
See application file for complete search history.

(56) References Cited

U.S. PATENT DOCUMENTS 11,026,193 B2 *   6/2021   Kim ..................... H04W 72/046
11,316,647 B2 *   4/2022   Zhang .................. H04L 1/1854
(Continued)

FOREIGN PATENT DOCUMENTS

| CN | 101132262 A | 2/2008 |
| CN | 104272635 A | 1/2015 |
| CN | 104601305 A | 5/2015 |

OTHER PUBLICATIONS

ISR received in application No. PCT/CN2017/096750 dated Nov. 9, 2017.
(Continued)

*Primary Examiner* — Phirin Sam

(57) ABSTRACT

The present disclosure provides a method and a device in wireless transmission. A User Equipment (UE) receives a first radio signal, then detects a low-latency signaling in L1 time intervals respectively, and transmits first HARQ-ACK information. The low-latency signaling includes a first field, and the first field is used for determining a relationship between a low-latency HARQ-ACK bit group and a first HARQ-ACK bit group. The first HARQ-ACK information includes part or all of HARQ-ACK bits in the first HARQ-ACK bit group. Through the design of the first field, the information in the first HARQ-ACK bit group can be put into the low-latency HARQ-ACK bit group to transmit, thereby optimizing the transmission of the Uplink Control Information (UCI) for HARQ-ACK, reducing the resource overhead and power overhead for the transmission of the UCI, and improving the overall system performance and spectrum efficiency.

20 Claims, 10 Drawing Sheets

Related U.S. Application Data continuation of application No. 16/271,891, filed on Feb. 11, 2019, now Pat. No. 10,728,007, which is a continuation of application No. PCT/CN2017/096750, filed on Aug. 10, 2017.

(56) References Cited

U.S. PATENT DOCUMENTS

| | | | |
|---|---|---|---|
| 2013/0039202 A1* | 2/2013 | Feuersanger | H04L 5/001 370/252 |
| 2016/0294531 A1* | 10/2016 | Loehr | H04W 72/21 |
| 2017/0150501 A1* | 5/2017 | Park | H04L 1/1887 |
| 2018/0048452 A1* | 2/2018 | Loehr | H04W 72/23 |
| 2018/0376500 A1* | 12/2018 | Yang | H04W 72/0446 |
| 2021/0126749 A1* | 4/2021 | Lyer | H04B 7/0617 |

OTHER PUBLICATIONS

First Office Action of Chinses patent application No. CN201610917646.5 dated Apr. 3, 2019.
First Search Report of Chinses patent application No. CN201610917646.5 dated Mar. 26, 2019.
Notification to Grant Patent Right for Invention of Chinses patent application No. CN201610917646.5 dated Jun. 5, 2019.
Nokia Networks et al. Considerations on UL HARQ for Supporting Latency Reduction 3GPP TSG-RAN WG1 Meeting #84 R1-160799. Feb. 5, 2016 (Feb. 5, 2016).
CATT. Discussion on the simultaneous transmissions of normal TTI and sTTI. 3GPP TSG-RAN WG1Meeting#85 R1-164235.May 14, 2016 (May 14, 2016).

* cited by examiner

METHOD AND DEVICE IN WIRELESS TRANSMISSION

CROSS REFERENCE TO RELATED APPLICATION

This application is a continuation application of the U.S. application Ser. No. 16/894,874, filed on Jun. 7, 2020, which is a continuation application of U.S. application Ser. No. 16/271,891, filed Feb. 11, 2019, which is a continuation of International Application No. PCT/CN2017/096750, field Aug. 10, 2017, claiming the priority benefit of Chinese Patent Application Serial Number 201610917646.5, filed on Oct. 21, 2016, and Serial Number 201610667979.7, filed on Aug. 12, 2016, the full disclosure of which is incorporated herein by reference.

TECHNICAL FIELD

The present disclosure relates to transmission schemes for radio signals in wireless communication systems, and in particular to a method and a device in a User Equipment (UE) and base station for Hybrid Automatic Repeat request (HARD) transmission.

BACKGROUND

In existing Long-term Evolution (LTE) and Long Term Evolution Advanced (LTE-A) systems, a Transmission Time Interval (TTI) or a subframe or a Physical Resource Block (PRB) pair corresponds to one milli-second (ms) in time domain. One LTE subframe includes two timeslots, which are a first timeslot and a second timeslot respectively. The first timeslot and the second timeslot occupy the former half milli-second and the latter half milli-second of one LTE subframe respectively.

In the study item of Latency Reduction (LR) in the 3rd Generation Partner Project (3GPP), one important application purpose is low-latency communication. In conventional LTE systems, the transmission of a Physical Downlink Shared Channel (PDSCH) and a corresponding Hybrid Automatic Repeat request Acknowledgment (HARQ-ACK) conform to a strict predefined timing relationship. In view of requirements of latency reduction, the conventional LTE frame structure needs to be redesigned. Correspondingly, a new downlink transmission and an uplink feedback corresponding to the downlink transmission also need to be redesigned.

SUMMARY

In the study item related to the latency reduction, one subject needed to be studied is a design of a timing relationship between a downlink transmission and an uplink feedback corresponding to the downlink transmission. Compared with LTE systems, in order to realize low-latency transmission, transmission time intervals for the downlink transmission and the corresponding uplink HARQ-ACK would be reduced. However, when a UE supports simultaneously multiple downlink transmissions based on a TTI of 1 ms duration and a Short Transmission Time Interval (sTTI) less than 1 ms duration, the uplink HARQ-ACKs corresponding to the multiple downlink transmissions probably may be transmitted in one same subframe.

One intuitive solution is to transmit the Uplink (UL) HARQ-ACK based on a TTI of 1 ms duration in a Physical Uplink Control Channel (PUCCH) or Physical Uplink Shared Channel (PUSCH), and transmit the UL HARQ-ACK based on a sTTI less than 1 ms duration in a designed new Short Latency Physical Uplink Control Channel (sPUCCH) or Short Latency Physical Uplink Shared Channel (sPUSCH). However, this method significantly increases the uplink power of the UE. For power limited UEs, their performances will be impacted. Meanwhile, the transmission of multiple UCIs (Uplink Control Information) would also lead to low efficiency.

In view of the above problems, the present disclosure provides a solution. It should be noted that the embodiments of the present disclosure and the characteristics in the embodiments may be mutually combined if no conflict is incurred. For example, embodiments in the UE of the present disclosure and the characteristics in the embodiments may be applied to the base station, and vice versa.

The present disclosure provides a method in a UE supporting HARQ, wherein the method includes:
    receiving a first radio signal;
    detecting a low-latency signaling in L1 time intervals respectively; and
    transmitting first HARQ-ACK information.

Herein, the low-latency signaling is a physical layer signaling; the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded; and the L1 is a positive integer.

In one embodiment, the above method is characterized in that: the corresponding low-latency HARQ-ACK bit group includes all or part of the HARQ-ACK information in the first HARQ-ACK bit group, thereby realizing the transmission of an UL HARQ-ACK corresponding to a PDSCH based on a TTI in a sPUCCH or sPUSCH based on a sTTI. Therefore, uplink resources and UE uplink transmit power are optimized, and transmissions of multiple UCIs corresponding to different TTIs and sTTIs are avoided.

In one embodiment, the above method is further characterized in that: through the design of the first field, it is dynamically indicated whether the information in the first HARQ-ACK bit group is contained in the corresponding low-latency HARQ-ACK bit group. When the UE has no low-latency scheduling, or when sPUCCH or sPUSCH resources corresponding to low-latency scheduling are not sufficient, or when the UE has high capability for uplink transmit power and can transmit multiple UCIs simultaneously, the first HARQ-ACK information is still transmitted on a conventional PUCCH or PUSCH.

In one embodiment, a TTI corresponding to the first radio signal is greater than a TTI corresponding to a radio signal scheduled by the low-latency signaling.

In one embodiment, the phase that the first field is used for determining the number of HARQ-ACK bits in the corresponding low-latency HARQ-ACK bit group refers that: a given low-latency HARQ-ACK bit group contains J HARQ- ACK bits, and the J HARQ-ACK bits contains I HARQ-ACK bits in the first HARQ-ACK bit group. The first field is used for determining the value of the J, and the given low-latency HARQ-ACK bit group corresponds to the corresponding low-latency HARQ-ACK bit group. The I is a positive integer, and the J is a positive integer not less than 1.

In one embodiment, the first field includes a first information bit group, the first information bit group includes and only includes 2 information bits, and a value of the first information bit group in the low-latency signaling is equal to a remainder left by dividing the number of the HARQ-ACK bits in the corresponding low-latency HARQ-ACK bit group by 4.

In one subembodiment of the above two embodiments, the value of the first information bit group is equal to a remainder left by dividing J by 4.

In one embodiment, the first field includes a first information bit group, the first information bit group includes and only includes Y information bits, and a value of the first information bit group in the low-latency signaling is equal to a remainder left by dividing the number of the HARQ-ACK bits in the corresponding low-latency HARQ-ACK bit group by $2^Y$. Herein, Y is a positive integer greater than 2, and the $2^Y$ is the Yth power of 2.

In one subembodiment, the number of the HARQ-ACK bits in the corresponding low-latency HARQ-ACK bit group is equal to J, and the value of the first information bit group is equal to a remainder left by dividing J by $2^Y$.

In one embodiment, the downlink bit block is a downlink Transport Block (TB).

In one embodiment, at least two time intervals among the L1 time intervals have different durations.

In one embodiment, any two time intervals among the L1 time intervals are orthogonal in time domain, that is, non-overlapping.

In one subembodiment of the above two embodiments, the time interval has a duration equal to one of 14*T, 7*T, 4*T and 2*T, and the T is a duration of a time window occupied by one multicarrier symbol.

In one embodiment, the multicarrier symbol in the present disclosure is one of an Orthogonal Frequency Division Multiplexing (OFDM) symbol including a Cyclic Prefix (CP), a Discrete Fourier Transform Spreading OFDM (DFT-s-OFDM) symbol including a CP, a Single-Carrier Frequency Division Multiple Access (SC-FDMA) symbol and a Filter Bank Multi Carrier (FBMC) symbol.

In one embodiment, the multicarrier symbol in the present disclosure is a downlink OFDM symbol in LTE.

In one embodiment, the multicarrier symbol in the present disclosure is an uplink SC-FDMA symbol in LTE.

In one embodiment, the first HARQ-ACK information includes part or all of HARQ-ACK bits in the first HARQ-ACK bit group.

In one embodiment, the corresponding low-latency HARQ-ACK bit group includes part or all of HARQ-ACK bits in the first HARQ-ACK bit group.

In one embodiment, the L1 is greater than 1.

In one embodiment, the first radio signal includes F1 downlink bit blocks, the F1 downlink bit blocks are transmitted in F1 subframes respectively, and the F1 is a positive integer greater than 1.

In one embodiment, the first radio signal includes F2 downlink bit blocks, the F2 downlink bit blocks are transmitted on F2 carriers respectively, and the F2 is a positive integer greater than 1.

In one embodiment, the first radio signal includes F3 radio sub-signals, the F3 radio sub-signals one-to-one correspond to F3 downlink bit blocks, and the radio sub-signal is an output after the corresponding downlink bit block is processed sequentially through channel coding, modulation mapper, layer mapper, precoding, resource element mapper, and generation of OFDM signals.

In one embodiment, the first radio signal is transmitted on a Physical Downlink Shared Channel (PDSCH).

In one embodiment, the first radio signal is transmitted on a Short Latency Physical Downlink Shared Channel (sPDSCH).

In one embodiment, a transmission channel corresponding to the first radio signal is a Downlink Shared Channel (DL-SCH).

In one embodiment, a physical layer channel corresponding to the low-latency signaling is a Short Latency Physical Downlink Control Channel (sPDCCH).

In one embodiment, the low-latency signaling corresponds to a Downlink Control information (DCI) for UL grant.

In one embodiment, a time interval occupied by the low-latency signaling indicates implicitly time-domain resources occupied by the corresponding low-latency HARQ-ACK bit group.

In one subembodiment, the implicit indication refers that: an end time of the time interval occupied by the low-latency signaling is T1 (ms), and a start time of the time-domain resource occupied by the corresponding low-latency HARQ-ACK bit group is (T1+T2) (ms). The T2 is a fixed value.

In one affiliated embodiment of the above subembodiment, the T2 is a positive integer multiple of a given duration, and the given duration is the duration of the time interval occupied by the low-latency signaling.

In one affiliated embodiment of the above subembodiment, the T2 is not less than T3. The T3 is a fixed value.

In one affiliated embodiment of the above two subembodiments, both the T2 and the T3 are a positive integer multiple of one of 14*T, 7*T, 4*T and 2*T, and the T is a duration of one multicarrier symbol.

In one embodiment, the low-latency signaling indicates explicitly time-domain resources occupied by the corresponding low-latency HARQ-ACK bit group.

In one subembodiment, the low-latency signaling includes a given information field, an end time of the time interval occupied by the low-latency signaling is T1 (ms), and a start time of the time-domain resource occupied by the corresponding low-latency HARQ-ACK bit group is (T1+T2) (ms). The T2 is an indicated value.

In one affiliated embodiment of the above subembodiment, the given information field is used for determining the T2, and the given information field is an information field in the low-latency signaling.

In one affiliated embodiment of the above subembodiment, the T2 is a positive integer multiple of one of 14*T, 7*T, 4*T and 2*T, and the T is a duration of a time window occupied by one multicarrier symbol.

According to one aspect of the present disclosure, the above method further includes:

determining air-interface resources occupied by the first HARQ-ACK information according to an LTE scheme based on a 1 ms TTI.

Herein, no low-latency signaling is detected in the L1 time intervals, the first HARQ-ACK information includes and only includes the first HARQ-ACK bit group, and the first radio signal corresponds to a TTI of 1 ms.

In one embodiment, the above method is characterized in that: the first HARQ-ACK information is not transmitted in a low-latency HARQ-ACK bit group corresponding to a sTTI, but in a PUCCH or PUSCH corresponding to a TTI.

In one embodiment, a radio signal scheduled by the low-latency signaling corresponds to a TTI less than 1 ms.

In one embodiment, the air-interface resources occupied by the first HARQ-ACK information belong to a PUCCH Format 1a; the determining air-interface resources occupied by the first HARQ-ACK information according to an LTE scheme based on a 1 ms TTI refers that: the UE schedules, according to PUCCH-ConfigCommon, a sequence number of the first Control Channel Element (CCE) occupied by the DCI for the first radio signal and a predefined HARQ-ACK timing relationship between the first radio signal and the first HARQ-ACK information, and determines at least one of time-domain resources, frequency-domain resources and code-domain resources occupied by the first HARQ-ACK information. The PUCCH-ConfigCommon is a Radio Resource Control (RRC) high-layer signaling, and specifically can refer to TS 36.331.

In one embodiment, the air-interface resources occupied by the first HARQ-ACK information belong to a PUCCH Format 3; the determining air-interface resources occupied by the first HARQ-ACK information according to an LTE scheme based on a 1 ms TTI refers that: the UE schedules, according to PUCCH-ConfigDedicated, a TPC indication in the DCI for the first radio signal and a predefined HARQ-ACK timing relationship between the first radio signal and the first HARQ-ACK information, and determines at least one of time-domain resources, frequency-domain resources and code-domain resources occupied by the first HARQ-ACK information. The PUCCH-ConfigDedicated is an RRC high-layer signaling, and specifically can refer to TS 36.331.

In one embodiment, the air-interface resources occupied by the first HARQ-ACK information belong to a PUSCH; the determining air-interface resources occupied by the first HARQ-ACK information according to an LTE scheme based on a 1 ms TTI refers that: the UE determines at least one of time-domain resources, frequency-domain resources and code-domain resources occupied by the first HARQ-ACK information, according to a predefined time-frequency position of the first HARQ-ACK information in the PUSCH, scheduling information corresponding to the PUSCH, and a predefined HARQ-ACK timing relationship between the first radio signal and the first HARQ-ACK information.

According to one aspect of the present disclosure, the above method includes:

receiving a first signaling.

Herein, the first signaling includes a Downlink Assignment Index (DAI) field, and the DAI field in the first signaling is used for determining the number of the HARQ-ACK bits in the first HARQ-ACK bit group.

In one embodiment, the DAI field in the first signaling includes two information bits, and a value of the two information bits is equal to a remainder left by dividing the number of the HARQ-ACK bits in the first HARQ-ACK bit group by 4.

In one embodiment, the first signaling includes scheduling information of the first radio signal. The scheduling information includes at least one of occupied time-frequency resources, a Modulation and Coding Scheme (MC S), a Redundancy Version (RV), a New Data Indicator (NDI) and a HARQ process number.

In one embodiment, the first signaling includes scheduling information of a second radio signal. The scheduling information includes at least one of occupied time-frequency resources, an MCS, an RV, an NDI and a HARQ process number. The second radio signal is an uplink signal.

In one subembodiment, a physical layer channel corresponding to the second radio signal is a PUSCH.

In one subembodiment, a transmission channel corresponding to the second radio signal is an UL-SCH.

In one subembodiment, the time-domain resources occupied by the corresponding low-latency HARQ-ACK bit group belong to the time-domain resources occupied by the second radio signal. The time-domain resources occupied by the first HARQ-ACK bit group belong to the time-domain resources occupied by the second radio signal.

In one subembodiment, the first signaling is used for determining the air-interface resources occupied by the first HARQ-ACK information.

In one affiliated embodiment, the air-interface resources occupied by the first HARQ-ACK information belong to a PUSCH.

In one embodiment, the first signaling is a DCI corresponding to UL grant.

According to one aspect of the present disclosure, the above method is characterized in that: L2 low-latency signaling(s) is(are) correctly received in L2 time intervals respectively, the L2 time interval(s) is(are) a subset of the L1 time intervals, and the L2 is a positive integer, the L2 low-latency signaling(s) at least include(s) a first low-latency signaling, a first low-latency HARQ-ACK bit group corresponding to the first low-latency signaling includes the first HARQ-ACK bit group.

In one embodiment, the above method is characterized in that part or all of HARQ-ACK bits in the first HARQ-ACK bit group are transmitted in the first low-latency HARQ-ACK bit group. Therefore, the number of UCIs to be transmitted is reduced; the HARQ-ACK corresponding to low-latency transmission and the HARQ-ACK corresponding to normal-latency transmission are transmitted in one physical channel.

In one embodiment, the first low-latency HARQ-ACK bit group is the first HARQ-ACK information.

In one embodiment, the first low-latency signaling is used for determining air-interface resources occupied by the first low-latency HARQ-ACK bit group.

According to one aspect of the present disclosure, the above method includes:

transmitting L2 low-latency radio signals.

Herein, the L2 low-latency signalings include scheduling information of the L2 low-latency radio signals respectively, and the scheduling information includes at least one of occupied time-frequency resources, an MCS, an RV, an NDI and a HARQ process number.

In one embodiment, a transmission channel corresponding to the low-latency radio signal is an UL-SCH.

In one embodiment, the L2 low-latency radio signals include L2 low-latency HARQ-ACK bit groups respectively.

In one embodiment, a given low-latency radio signal is used for transmitting the first low-latency HARQ-ACK bit group, and the given low-latency radio signal is one of the L2 low-latency radio signals.

According to one aspect of the present disclosure, the above method is characterized in that: a first field in the first low-latency signaling is used for determining at least the former one of the number of HARQ-ACK bits in a first target HARQ-ACK bit group and positions of the HARQ-ACK bits contained in the first target HARQ-ACK bit group in the first HARQ-ACK bit group, and the first target HARQ-ACK bit group is composed of HARQ-ACK bits that belong to both the first low-latency HARQ-ACK bit group and the first HARQ-ACK bit group.

In one embodiment, the above method is characterized in that: the first target HARQ-ACK bit group is transmitted in a given uplink physical channel and meanwhile includes UL HARQ-ACKs corresponding to downlink data with different transmission latencies.

In one embodiment, the corresponding low-latency HARQ-ACK bit group is the first low-latency HARQ-ACK bit group.

In one embodiment, the first field includes a third information bit group, and a value of the third information bit group in the first low-latency signaling is equal to the number of the HARQ-ACK bits that belong to both the corresponding low-latency HARQ-ACK bit group and the first HARQ-ACK bit group.

In one subembodiment, the above description refers that: the first HARQ-ACK bit group contains I1 HARQ-ACK bits, and I2 HARQ-ACK bits among the I1 HARQ-ACK bits belong to the corresponding low-latency HARQ-ACK bit group. The third information bit group is used for determining the value of the I2. The I1 is a positive integer, and the I2 is a positive integer less than the I1.

In one affiliated embodiment of the above subembodiment, the I2 HARQ-ACK bits correspond to the first target HARQ-ACK bit group.

In one embodiment, the HARQ-ACK bits contained in the first target HARQ-ACK bit group are at consecutive positions in the first HARQ-ACK bit group.

In one embodiment, the first field includes a fourth information bit group, and the fourth information bit group in the first low-latency signaling is used for determining positions of the HARQ-ACK bits contained in the first target HARQ-ACK bit group in the first HARQ-ACK bit group.

In one subembodiment, the above description refers that: the first HARQ-ACK bit group contains I1 HARQ-ACK bits, and I2 HARQ-ACK bits among the I1 HARQ-ACK bits belong to the first target HARQ-ACK bit group. The fourth information bit group is used for determining the positions of the I2 HARQ-ACK bits in the I1 HARQ-ACK bits. The I1 is a positive integer, and the I2 is a positive integer less than the I1.

In one affiliated embodiment of the above subembodiment, the positions of the I2 HARQ-ACK bits in the I1 HARQ-ACK bits are non-consecutive.

In one subembodiment, the positions of the HARQ-ACK bits contained in the first target HARQ-ACK bit group in the first HARQ-ACK bit group is one of Q candidate positions, and the Q is a positive integer. One of the Q candidate positions is determined through the fourth information bit group.

In one affiliated embodiment of the subembodiment, the Q is 2.

In one affiliated embodiment of the subembodiment, the Q is 4.

According to one aspect of the present disclosure, the above method is characterized in that: the first field includes at least a second information bit group among a first information bit group and the second information bit group; the first information bit group includes two information bits, and the second information bit group includes one information bit; a value of the first information bit group in the low-latency signaling is equal to a remainder left by dividing the number of the HARQ-ACK bits in the corresponding low-latency HARQ-ACK bit group by 4, and the second information bit group in the low-latency signaling indicates whether the corresponding low-latency HARQ-ACK bit group includes the first HARQ-ACK bit group.

In one embodiment, the above method is characterized in that: the HARQ-ACK bits in the first HARQ-ACK bit group can all belong to the corresponding low-latency HARQ-ACK bit group.

According to one aspect of the present disclosure, the above method is characterized in that: the first HARQ-ACK bit group includes and only includes HARQ-ACK bits transmitted on a given physical layer channel determined according to the LTE scheme based on a 1 ms TTI.

In one embodiment, HARQ-ACK information corresponding to the first HARQ-ACK bit group corresponds to one sTTI.

In one embodiment, HARQ-ACK information corresponding to the first HARQ-ACK bit group corresponds to two sTTIs respectively.

In one embodiment, the phase that the first HARQ-ACK bit group includes and only includes HARQ-ACK bits transmitted on a given physical layer channel determined according to the LTE scheme based on a 1 ms TTI refers that: in a Frequency Division dual (FDD) mode, the given physical layer channel is a PUCCH or PUSCH, the first HARQ-ACK bit group corresponds to the HARQ-ACK information of a given PDSCH, the given PDSCH is transmitted on a subframe#(n−4), and the PUCCH or PUSCH is transmitted on a subframe #n. The n is a positive integer not less than 4.

In one embodiment, the phase that the first HARQ-ACK bit group includes and only includes HARQ-ACK bits transmitted on a given physical layer channel determined according to the LTE scheme based on a 1 ms TTI refers that: in a Time Division dual (FDD) mode, the given physical layer channel is a PUCCH or PUSCH, the first HARQ-ACK bit group corresponds to the HARQ-ACK information of a given PDSCH, the given PDSCH is transmitted on a subframe#(n−k), and the PUCCH or PUSCH is transmitted on a subframe #n. The k∈K, the definition of the K can refer to the Table 10.1.3.1-1 in TS 36.213 (see the table below), the K corresponds to a set $\{k_0, k_1, \ldots, k_{M-1}\}$, and the relationship between the K and the $\{k_0, k_1, \ldots, k_{M-1}\}$ is related to the value of n and the corresponding TDD configuration.

TABLE 10.1.3.1-1

Downlink association set: $\{k_0, k_1, \ldots, k_{M-1}\}$ for TDD

| UL/DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The present disclosure provides a method in a base station supporting HARQ, wherein the method includes:
transmitting a first radio signal;
transmitting a low-latency signaling in L1 time intervals; and
receiving first HARQ-ACK information.

Herein, the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded. The L1 is a positive integer.

According to one aspect of the present disclosure, the above method includes:
configuring air-interface resources for the first HARQ-ACK information according to an LTE scheme based on a 1 ms TTI.

Herein, no low-latency signaling is transmitted in the L1 time intervals, the first HARQ-ACK information includes and only includes the first HARQ-ACK bit group, and the first radio signal corresponds to a TTI of 1 ms.

According to one aspect of the present disclosure, the above method includes:
transmitting a first signaling.

Herein, the first signaling includes a DAI field, and the DAI field in the first signaling is used for determining the number of the HARQ-ACK bits in the first HARQ-ACK bit group.

Specifically, according to one aspect of the present disclosure, the above method is characterized in that: L2 low-latency signaling(s) is(are) transmitted in L2 time intervals respectively, the L2 time interval(s) is(are) a subset of the L1 time intervals, and the L2 is a positive integer, the L2 low-latency signaling(s) at least include(s) a first low-latency signaling, a first low-latency HARQ-ACK bit group corresponding to the first low-latency signaling includes the first HARQ-ACK bit group.

According to one aspect of the present disclosure, the above method includes:
receiving L2 low-latency radio signals.

Herein, the L2 low-latency signalings include scheduling information of the L2 low-latency radio signals respectively, and the scheduling information includes at least one of occupied time-frequency resources, an MCS, an RV, an NDI and a HARQ process number.

According to one aspect of the present disclosure, the above method is characterized in that: a first field in the first low-latency signaling is used for determining at least the former one of the number of HARQ-ACK bits in a first target HARQ-ACK bit group and positions of the HARQ-ACK bits contained in the first target HARQ-ACK bit group in the first HARQ-ACK bit group, and the first target HARQ-ACK bit group is composed of HARQ-ACK bits that belong to both the first low-latency HARQ-ACK bit group and the first HARQ-ACK bit group.

According to one aspect of the present disclosure, the above method is characterized in that: the first field includes at least a second information bit group among a first information bit group and the second information bit group; the first information bit group includes two information bits, and the second information bit group includes one information bit; a value of the first information bit group in the low-latency signaling is equal to a remainder left by dividing the number of the HARQ-ACK bits in the corresponding low-latency HARQ-ACK bit group by 4, and the second information bit group in the low-latency signaling indicates whether the corresponding low-latency HARQ-ACK bit group includes the first HARQ-ACK bit group.

According to one aspect of the present disclosure, the above method is characterized in that: the first HARQ-ACK bit group includes and only includes HARQ-ACK bits transmitted on a given physical layer channel determined according to the LTE scheme based on a 1 ms TTI.

The present disclosure provides a UE supporting HARQ, wherein the UE includes:
a first receiver, to receive a first radio signal;
a second receiver, to detect a low-latency signaling in L1 time intervals respectively; and
a first transceiver, to transmit first HARQ-ACK information.

Herein, the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded; and the L1 is a positive integer.

In one embodiment, the first receiver receives a first signaling; the first signaling includes a DAI field; and the DAI field in the first signaling is used for determining the number of the HARQ-ACK bits in the first HARQ-ACK bit group.

In one embodiment, the first transceiver determines air-interface resources occupied by the first HARQ-ACK information according to an LTE scheme based on a 1 ms TTI; the first transceiver detects no low-latency signaling in the L1 time intervals, the first HARQ-ACK information includes and only includes the first HARQ-ACK bit group, and the first radio signal corresponds to a TTI of 1 ms.

In one embodiment, the first transceiver transmits L2 low-latency radio signals. The L2 low-latency signalings include scheduling information of the L2 low-latency radio signals respectively, and the scheduling information includes at least one of occupied time-frequency resources, an MCS, an RV, an NDI and a HARQ process number.

According to one aspect of the present disclosure, the above UE is characterized in that: L2 low-latency signaling(s) is(are) correctly received in L2 time intervals respectively, the L2 time interval(s) is(are) a subset of the L1 time intervals, and the L2 is a positive integer, the L2 low-latency signaling(s) at least include(s) a first low-latency signaling, a first low-latency HARQ-ACK bit group corresponding to the first low-latency signaling includes the first HARQ-ACK bit group.

According to one aspect of the present disclosure, the above UE is characterized in that: a first field in the first low-latency signaling is used for determining at least the former one of the number of HARQ-ACK bits in a first target HARQ-ACK bit group and positions of the HARQ-ACK bits contained in the first target HARQ-ACK bit group in the first HARQ-ACK bit group, and the first target HARQ-ACK bit group is composed of HARQ-ACK bits that belong to both the first low-latency HARQ-ACK bit group and the first HARQ-ACK bit group.

According to one aspect of the present disclosure, the above UE is characterized in that: the first field includes at least a second information bit group among a first information bit group and the second information bit group; the first information bit group includes two information bits, and the second information bit group includes one information bit. A value of the first information bit group in the low-latency signaling is equal to a remainder left by dividing the number of the HARQ-ACK bits in the corresponding low-latency HARQ-ACK bit group by 4, and the second information bit group in the low-latency signaling indicates whether the corresponding low-latency HARQ-ACK bit group includes the first HARQ-ACK bit group.

According to one aspect of the present disclosure, the above UE is characterized in that: the first HARQ-ACK bit group includes and only includes HARQ-ACK bits transmitted on a given physical layer channel determined according to the LTE scheme based on a 1 ms TTI.

The present disclosure provides a base station supporting HARQ, wherein the base station includes:

a first transmitter, to transmit a first radio signal;

a second transmitter, to transmit a low-latency signaling in L1 time intervals; and a second transceiver, to receive first HARQ-ACK information.

Herein, the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded. The L1 is a positive integer.

In one embodiment, the first transmitter transmits a first signaling; the first signaling includes a DAI field, and the DAI field in the first signaling is used for determining the number of the HARQ-ACK bits in the first HARQ-ACK bit group.

In one embodiment, the second transceiver further configures air-interface resources for the first HARQ-ACK information according to an LTE scheme based on a 1 ms TTI; the second transceiver transmits no low-latency signaling in the L1 time intervals, the first HARQ-ACK information includes and only includes the first HARQ-ACK bit group, and the first radio signal corresponds to a TTI of 1 ms.

In one embodiment, the second transceiver receives L2 low-latency radio signals; the L2 low-latency signalings include scheduling information of the L2 low-latency radio signals respectively, and the scheduling information includes at least one of occupied time-frequency resources, an MCS, an RV, an NDI and a HARQ process number.

According to one aspect of the present disclosure, the above base station is characterized in that: L2 low-latency signaling(s) is(are) transmitted in L2 time intervals respectively, the L2 time interval(s) is(are) a subset of the L1 time intervals, and the L2 is a positive integer, the L2 low-latency signaling(s) at least include(s) a first low-latency signaling, a first low-latency HARQ-ACK bit group corresponding to the first low-latency signaling includes the first HARQ-ACK bit group.

According to one aspect of the present disclosure, the above base station is characterized in that: a first field in the first low-latency signaling is used for determining at least the former one of the number of HARQ-ACK bits in a first target HARQ-ACK bit group and positions of the HARQ-ACK bits contained in the first target HARQ-ACK bit group in the first HARQ-ACK bit group, and the first target HARQ-ACK bit group is composed of HARQ-ACK bits that belong to both the first low-latency HARQ-ACK bit group and the first HARQ-ACK bit group.

According to one aspect of the present disclosure, the above base station is characterized in that: the first field includes at least a second information bit group among a first information bit group and the second information bit group; the first information bit group includes two information bits, and the second information bit group includes one information bit; a value of the first information bit group in the low-latency signaling is equal to a remainder left by dividing the number of the HARQ-ACK bits in the corresponding low-latency HARQ-ACK bit group by 4, and the second information bit group in the low-latency signaling indicates whether the corresponding low-latency HARQ-ACK bit group includes the first HARQ-ACK bit group.

According to one aspect of the present disclosure, the above base station is characterized in that: the first HARQ-ACK bit group includes and only includes HARQ-ACK bits transmitted on a given physical layer channel determined according to the LTE scheme based on a 1 ms TTI.

In one embodiment, compared with existing published technologies, the present disclosure has the following technical effects.

Through the design of the first field, part or all of the HARQ-ACK bits in the first HARQ-ACK bit group can be put into the low-latency HARQ-ACK bit group to transmit, thereby reducing the number of UCIs to be transmitted and allocating properly uplink resources and uplink transmit power.

Through the design of the fallback process, when no low-latency signaling is transmitted in the L1 time intervals, the first HARQ-ACK information includes and only includes the first HARQ-ACK bit group, and the first HARQ-ACK bit group is transmitted only on a UCI corresponding to non-low-latency transmission. Uplink resources can be configured more flexibly.

Through the design of the first information bit group, the second information bit group, the third information bit group and the fourth information bit group in the first field, the relationship between the first HARQ-ACK bit group and the low-latency HARQ-ACK bit group, and the number of the HARQ-ACK bits in the first target HARQ-ACK bit group can be configured more flexibly. Further, uplink channel resources to transmit low-latency uplink HARQ-ACK bits and non-low-latency uplink HARQ-ACK bits can be configured properly, thereby improving uplink transmission efficiency and performance.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if there is no conflict.

Embodiment 1

Figure 1:
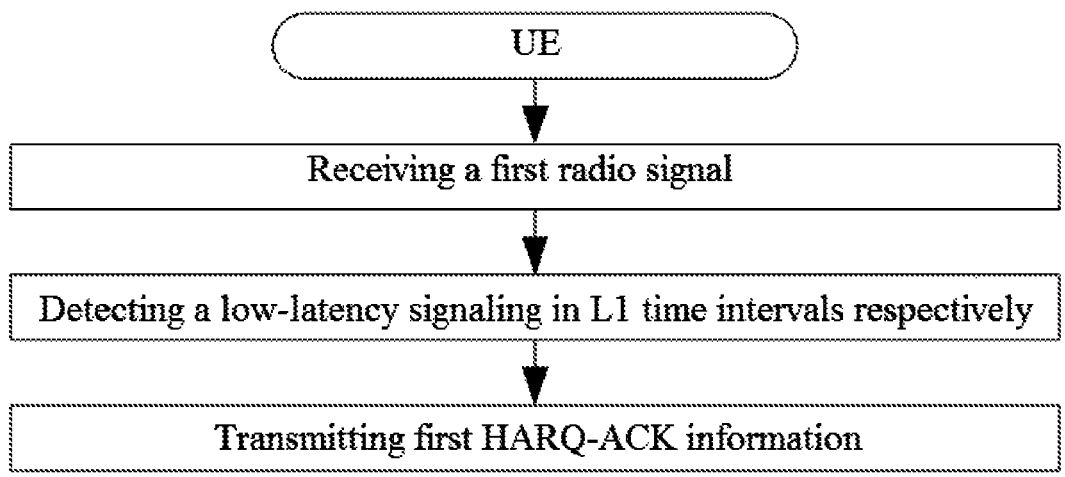
FIG. 1 is a flowchart of the transmission of a first radio signal according to one embodiment of the present disclosure.

Embodiment 1 illustrates an example of a flowchart of the transmission of a first radio signal according to one embodiment of the present disclosure, as shown in FIG. 1. In FIG. 1, the UE in the present disclosure first receives a first radio signal, then detects a low-latency signaling in L1 time intervals respectively, and finally transmits first HARQ-ACK information.

In Embodiment 1, the low-latency signaling is a physical layer signaling; the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded; and the L1 is a positive integer.

In one subembodiment, a TTI corresponding to the first radio signal is greater than a TTI corresponding to a radio signal scheduled by the low-latency signaling.

In one subembodiment, the phase that the first field is used for determining the number of HARQ-ACK bits in the corresponding low-latency HARQ-ACK bit group refers that: a given low-latency HARQ-ACK bit group contains J HARQ-ACK bits, and the J HARQ-ACK bits contains I HARQ-ACK bits in the first HARQ-ACK bit group. The first field is used for determining the value of the J, and the given low-latency HARQ-ACK bit group corresponds to the corresponding low-latency HARQ-ACK bit group. The I is a positive integer, and the J is a positive integer not less than 1.

In one subembodiment, the first field includes a first information bit group, the first information bit group includes and only includes 2 information bits, and a value of the first information bit group in the low-latency signaling is equal to a remainder left by dividing the number of the HARQ-ACK bits in the corresponding low-latency HARQ-ACK bit group by 4.

In one affiliated embodiment of the above two subembodiments, the value of the first information bit group is equal to a remainder left by dividing J by 4.

In one subembodiment, the first field includes a first information bit group, the first information bit group includes and only includes Y information bits, and a value of the first information bit group in the low-latency signaling is equal to a remainder left by dividing the number of the HARQ-ACK bits in the corresponding low-latency HARQ-ACK bit group by $2^Y$. Herein, Y is a positive integer greater than 2, and the $2^Y$ is the Yth power of 2.

In one affiliated embodiment of the above subembodiment, the number of the HARQ-ACK bits in the corresponding low-latency HARQ-ACK bit group is equal to J, and the value of the first information bit group is equal to a remainder left by dividing J by $2^Y$.

In one subembodiment, the downlink bit block is a downlink TB.

In one subembodiment, at least two time intervals among the L1 time intervals have different durations.

In one subembodiment, any two time intervals among the L1 time intervals are orthogonal in time domain, that is, non-overlapping.

In one affiliated embodiment of the above two subembodiments, the time interval has a duration equal to one of 14\*T, 7\*T, 4\*T and 2\*T, and the T is a duration of a time window occupied by one multicarrier symbol.

In one subembodiment, the multicarrier symbol in the present disclosure is one of an OFDM symbol including a CP, a DFT-s-OFDM symbol including a CP, an SC-FDMA symbol and an FBMC symbol.

In one subembodiment, the multicarrier symbol in the present disclosure is a downlink OFDM symbol in LTE.

In one subembodiment, the multicarrier symbol in the present disclosure is an uplink SC-FDMA symbol in LTE.

In one subembodiment, the first HARQ-ACK information includes part or all of HARQ-ACK bits in the first HARQ-ACK bit group.

In one subembodiment, the corresponding low-latency HARQ-ACK bit group includes part or all of HARQ-ACK bits in the first HARQ-ACK bit group.

In one subembodiment, the L1 is greater than 1.

In one subembodiment, the first radio signal includes F1 downlink bit blocks, the F1 downlink bit blocks are transmitted in F1 subframes respectively, and the F1 is a positive integer greater than 1.

In one subembodiment, the first radio signal includes F2 downlink bit blocks, the F2 downlink bit blocks are transmitted on F2 carriers respectively, and the F2 is a positive integer greater than 1.

In one subembodiment, the first radio signal includes F3 radio sub-signals, the F3 radio sub-signals one-to-one corresponds to F3 downlink bit blocks, and the radio sub-signal is an output after the corresponding downlink bit block is processed sequentially through channel coding, modulation mapper, layer mapper, precoding, resource element mapper, and generation of OFDM signals.

In one subembodiment, the first radio signal is transmitted on a PDSCH.

In one subembodiment, the first radio signal is transmitted on a sPDSCH.

In one subembodiment, a transmission channel corresponding to the first radio signal is a DL-SCH.

In one subembodiment, a physical layer channel corresponding to the low-latency signaling is a sPDCCH.

In one subembodiment, the low-latency signaling corresponds to a DCI of UL grant.

In one subembodiment, a time interval occupied by the low-latency signaling indicates implicitly time-domain resources occupied by the corresponding low-latency HARQ-ACK bit group.

In one affiliated embodiment of the above subembodiment, the implicit indication refers that: an end time of the time interval occupied by the low-latency signaling is T1 (ms), and a start time of the time-domain resource occupied by the corresponding low-latency HARQ-ACK bit group is (T1+T2) (ms). The T2 is a fixed value.

In an example of the above affiliated embodiment, the T2 is a positive integer multiple of a given duration, and the given duration is the duration of the time interval occupied by the low-latency signaling.

In an example of the above affiliated embodiment, the T2 is not less than T3. The T3 is a fixed value.

In an example of the above two affiliated embodiments, both the T2 and the T3 are a positive integer multiple of one of 14*T, 7*T, 4*T and 2*T, and the T is a duration of one multicarrier symbol.

In one subembodiment, the low-latency signaling indicates explicitly time-domain resources occupied by the corresponding low-latency HARQ-ACK bit group.

In one affiliated embodiment of the above subembodiment, the low-latency signaling includes a given information field, an end time of the time interval occupied by the low-latency signaling is T1 (ms), and a start time of the time-domain resource occupied by the corresponding low-latency HARQ-ACK bit group is (T1+T2) (ms). The T2 is an indicated value.

In an example of the above affiliated embodiment, the given information field is used for determining the T2, and the given information field is an information field in the low-latency signaling.

In an example of the above affiliated embodiment, the T2 is a positive integer multiple of one of 14*T, 7*T, 4*T and 2*T, and the T is a duration of a time window occupied by one multicarrier symbol.

Embodiment 2

Figure 2:
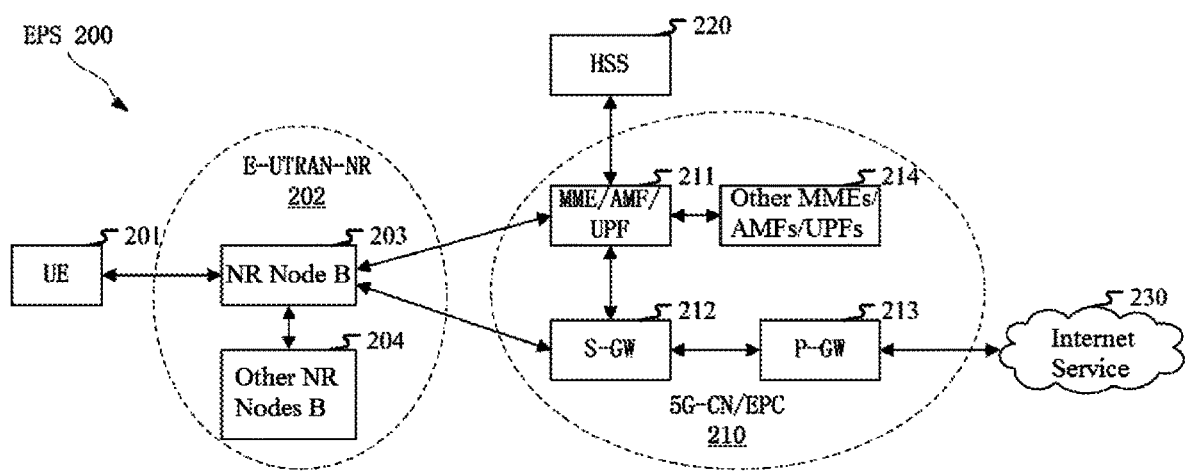
FIG. 2 is a diagram illustrating a network architecture according to one embodiment of the present application.

Embodiment 2 illustrates an example of a diagram for a network architecture, as shown in FIG. 2. FIG. 2 is a diagram illustrating a network architecture 200 of NR 5G, LTE and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the present application can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the present application.

In one subembodiment, the gNB 203 corresponds to the base station in the present application.

In one subembodiment, the UE 201 supports low-latency communications.

In one subembodiment, the gNB 203 supports low-latency communications.

Embodiment 3

Figure 3:
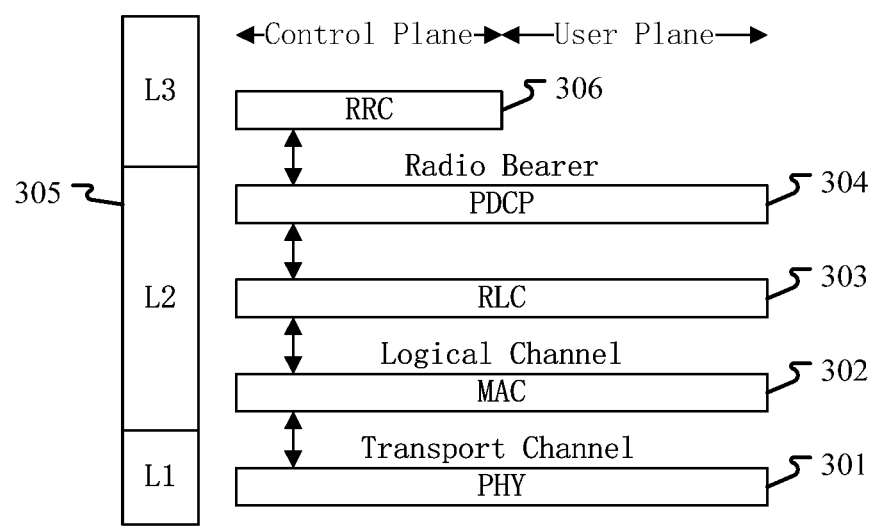
FIG. 3 is a diagram illustrating an embodiment of a radio protocol architecture of a user plane and a control plane according to one embodiment of the present application.

Embodiment 3 is a diagram illustrating an embodiment of a radio protocol architecture of a user plane and a control plane according to the present application, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW 213 on the network side and an application layer terminated at the other end of the connection (i.e. a peer UE, a server, etc.). The PDCP sublayer 304 provides multiplexing between different radio bearers and logical channels. The PDCP sublayer 304 also provides header compression for higher-layer packets so as to reduce radio transmission overhead. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the present application.

In one subembodiment, the radio protocol architecture shown in FIG. 3 is applicable to the base station in the present application.

In one subembodiment, the first radio signal in the present disclosure is generated by the PHY 301.

In one subembodiment, the first radio signal in the present disclosure is generated by the MAC sublayer 302.

In one subembodiment, the low-latency signaling in the present disclosure is generated by the PHY 301.

In one subembodiment, the first HARQ-ACK information in the present disclosure is generated by the PHY 301.

In one subembodiment, the first HARQ-ACK information in the present disclosure is generated by MAC sublayer 302.

Embodiment 4

Figure 4:
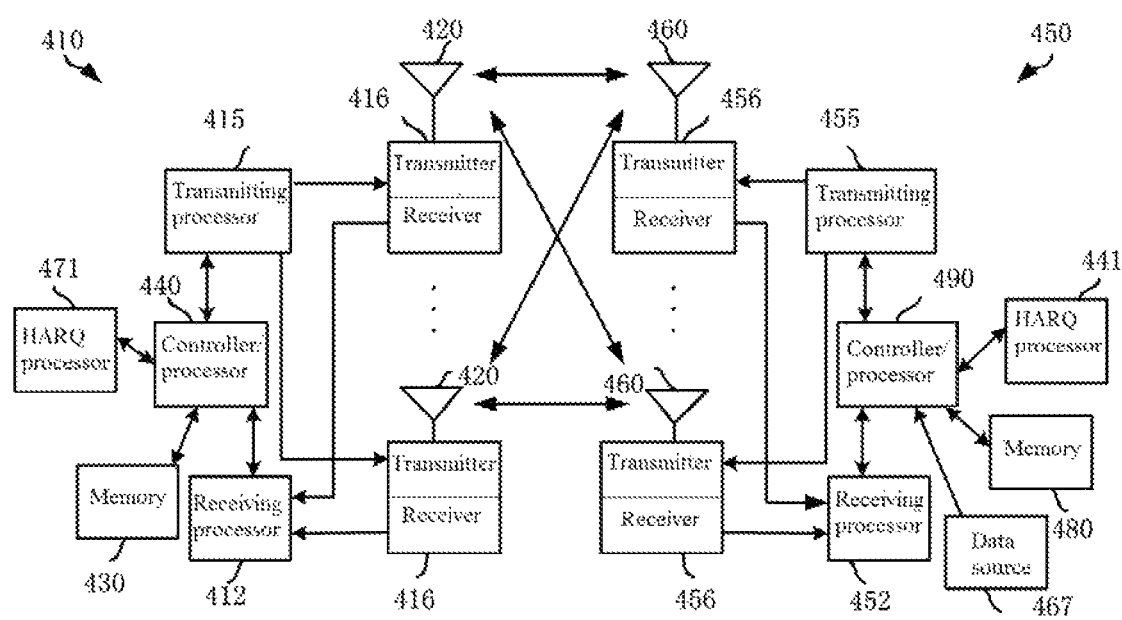
FIG. 4 is a diagram illustrating a base station and a given UE according to one embodiment of the present application.

Embodiment 4 illustrates a diagram of a base station and a given UE according to the present application, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a HARQ processor 471, a transmitter/receiver 416 and an antenna 420.

The UE 450 includes a controller/processor 490, a memory 480, a data source 467, a transmitting processor 455, a receiving processor 452, a HARQ processor 441, a transmitter/receiver 456 and an antenna 460.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit used for transmission requirements. The scheduling unit is configured to schedule air-interface resources corresponding to transmission requirements.

The transmitting processor 415 receives a bit stream output from the controller/processor 440, and performs various signal transmitting processing functions used for L1 layer (that is, PHY), including encoding, interleaving, scrambling, modulation, power control/allocation, generation of physical layer control signalings (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions used for L1 layer (that is, PHY), including decoding, de-interleaving, descrambling, demodulation, extraction of physical layer control signalings, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to a memory 480 that stores program codes and data. The memory 480 may be a computer readable medium.

In Uplink (UL) transmission, processes relevant to the UE 450 include the following.

The data source 467 provides a higher-layer packet to the controller/processor 490. The controller/processor 490 provides header compression, encryption, packet segmentation and reordering, multiplexing and de-multiplexing between a logical channel and a transport channel, to implement L2 protocols used for the user plane and the control plane. The higher-layer packet may include data or control information.

The controller/processor 490 is connected to the memory 480 that stores program codes and data. The memory 480 may be a computer readable medium.

The HARQ processor 441 determines the transmission of the first HARQ-ACK information, and determines at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group, and outputs the result to the controller/processor 440.

The transmitting processor 455 receives a bit stream output from the controller/processor 490, and performs various signal transmitting processing functions used for L1 layer (that is, PHY), including encoding, interleaving, scrambling, modulation, power control/allocation, generation of physical layer control signalings.

The transmitter 456 is configured to convert the baseband signal provided by the MIMO transmitting processor 471 into a radio-frequency signal and transmit the radio-frequency signal via the antenna 460. Each transmitter 416 performs sampling processing on respective input symbol streams to obtain respective sampled signal streams. Each transmitter 456 performs further processing (for example, digital-to-analogue conversion, amplification, filtering, up conversion, etc.) on respective sampled streams to obtain an uplink signal.

In UL transmission, processes relevant to the base station device 410 include the following.

The receiver 416 is configured to convert a radio-frequency signal received via the antenna 420 into a baseband signal and provide the baseband signal to the receiving processor 412.

The receiving processor 412 performs various signal receiving processing functions used for L1 layer (that is, PHY), including decoding, de-interleaving, descrambling, demodulation, extraction of physical layer control signalings, etc.

The HARQ processor 471 determines the transmission of the first HARQ-ACK information, and determines at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group, and outputs the result to the transmitting processor 415 through the controller/processor 440.

The controller/processor 440 receives a bit stream output from the receiving processor 412, and provides header decompression, decryption, packet segmentation and reordering, multiplexing and de-multiplexing between a logical channel and a transport channel, to implement L2 protocols used for the user plane and the control plane.

The controller/processor 440 may be connected to the memory 430 that stores program codes and data. The memory 430 may be a computer readable medium.

In one subembodiment, the UE 450 device includes at least one processor and at least one memory. The at least one memory includes computer program codes. The at least one memory and the computer program codes are configured to be used in collaboration with the at least one processor. The UE 450 device at least receives a first radio signal, detects a low-latency signaling in L1 time intervals respectively, and transmits first HARQ-ACK information; wherein the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded; and the L1 is a positive integer.

In one subembodiment, the UE 450 includes a memory that stores a computer readable instruction program. The computer readable instruction program generates an action when executed by at least one processor. The action includes receiving a first radio signal, detecting a low-latency signaling in L1 time intervals respectively, and transmitting first HARQ-ACK information; wherein the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded; and the L1 is a positive integer.

In one subembodiment, the gNB 410 includes at least one processor and at least one memory. The at least one memory includes computer program codes. The at least one memory and the computer program codes are configured to be used in collaboration with the at least one processor. The gNB 410 at least transmits a first radio signal, transmits a low-latency signaling in L1 time intervals, and receives first HARQ-ACK information; wherein the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded; and the L1 is a positive integer.

In one subembodiment, the gNB 410 includes a memory that stores a computer readable instruction program. The computer readable instruction program generates an action when executed by at least one processor. The action includes transmitting a first radio signal, transmitting a low-latency signaling in L1 time intervals, and receiving first HARQ-ACK information; wherein the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded; and the L1 is a positive integer.

In one subembodiment, the UE 450 corresponds to the UE in the present disclosure.

In one subembodiment, the gNB 410 corresponds to the base station in the present disclosure.

In one subembodiment, at least the former two of the receiver 456, the receiving processor 452 and the controller/processor 490 are used for receiving the first radio signal.

In one subembodiment, the HARQ processor 441 determines at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group.

In one subembodiment, the HARQ processor 441 determines air-interface resources occupied by the first HARQ-ACK information according to an LTE scheme based on a 1 ms TTI.

In one subembodiment, at least the former two of the receiver 456, the receiving processor 452 and the controller/processor 490 are used for detecting a low-latency signaling in L1 time intervals respectively.

In one subembodiment, at least the former two of the receiver 456, the receiving processor 452 and the controller/processor 490 are used for receiving a first signaling.

In one subembodiment, at least the former two of the transmitter 456, the transmitting processor 455 and the controller/processor 490 are used for transmitting the first HARQ-ACK information.

In one subembodiment, at least the former two of the transmitter 456, the transmitting processor 455 and the controller/processor 490 are used for transmitting L2 low-latency radio signals.

In one subembodiment, at least the former two of the transmitter 416, the transmitting processor 415 and the controller/processor 440 are used for transmitting the first radio signal.

In one subembodiment, the HARQ processor 471 determines at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group.

In one subembodiment, the HARQ processor 471 determines air-interface resources occupied by the first HARQ-ACK information according to an LTE scheme based on a 1 ms TTI.

In one subembodiment, at least the former two of the transmitter 416, the transmitting processor 415 and the controller/processor 440 are used for transmitting a low-latency signaling in L1 time intervals respectively.

In one subembodiment, at least the former two of the transmitter 416, the transmitting processor 415 and the controller/processor 440 are used for transmitting a first signaling.

In one subembodiment, at least the former two of the receiver 416, the receiving processor 412 and the controller/processor 440 are used for receiving the first HARQ-ACK information.

In one subembodiment, at least the former two of the receiver 416, the receiving processor 412 and the controller/processor 440 are used for receiving L2 low-latency radio signals.

Embodiment 5

Figure 5:
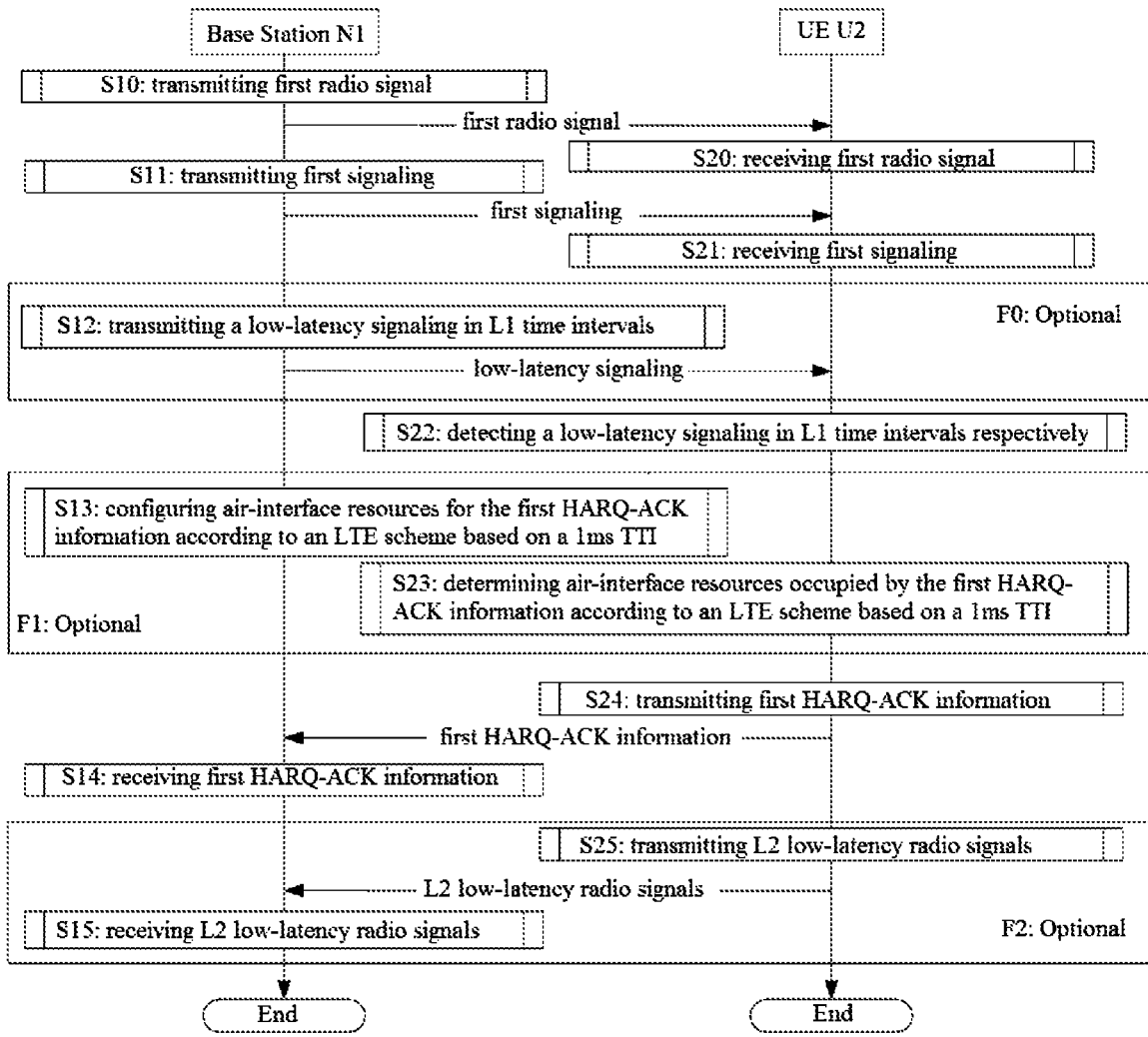
FIG. 5 is a flowchart illustrating the transmission of a first radio signal according to one embodiment of the present application.

Embodiment 5 illustrates an example of a flowchart of the transmission of a first radio signal according to the present application, as shown in FIG. 5. In FIG. 5, a base station N1 is a maintenance base station for a serving cell of the UE U2, and steps in boxes F0, F1 and F2 are optional.

The base station N1 transmits a first radio signal in S10, transmits a first signaling in S11, transmits a low-latency signaling in L1 time intervals in S12, configures air-interface resources for the first HARQ-ACK information according to an LTE scheme based on a 1 ms TTI in S13, receives first HARQ-ACK information in S14, and receives L2 low-latency radio signals in S15.

The UE U2 receives a first radio signal in S20, receives a first signaling in S21, detects a low-latency signaling in L1 time intervals respectively in S22, determines air-interface resources occupied by the first HARQ-ACK information according to an LTE scheme based on a 1 ms TTI in S23, transmits first HARQ-ACK information in S24, and transmits L2 low-latency radio signal(s) in S25.

In Embodiment 5, the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded; the L1 is a positive integer; no low-latency signaling is detected in the L1 time intervals, the first HARQ-ACK information includes and only includes the first HARQ-ACK bit group, and the first radio signal corresponds to a TTI of 1 ms; the first signaling includes a DAI field, and the DAI field in the first signaling is used for determining the number of the HARQ-ACK bits in the first HARQ-ACK bit group; L2 low-latency signaling(s) is(are) correctly received in L2 time intervals respectively, the L2 time interval(s) is(are) a subset of the L1 time intervals, and the L2 is a positive integer; the L2 low-latency signaling(s) at least include(s) a first low-latency signaling, a first low-latency HARQ-ACK bit group corresponding to the first low-latency signaling includes the HARQ-ACK bit in the first HARQ-ACK bit group; the L2 low-latency signaling(s) include(s) scheduling information of the L2 low-latency radio signal(s) respectively, and the scheduling information includes at least one of occupied time-frequency resources, an MCS, an RV, an NDI and a HARQ process number; a first field in the first low-latency signaling is used for determining at least the former one of the number of HARQ-ACK bits in a first target HARQ-ACK bit group and positions of the HARQ-ACK bits contained in the first target HARQ-ACK bit group in the first HARQ-ACK bit group, and the first target HARQ-ACK bit group is composed of HARQ-ACK bits that belong to both the first low-latency HARQ-ACK bit group and the first HARQ-ACK bit group; the first field includes at least a second information bit group among a first information bit group and the second information bit group; the first information bit group includes two information bits, and the second information bit group includes one information bit; a value of the first information bit group in the low-latency signaling is equal to a remainder left by dividing the number of the HARQ-ACK bits in the corresponding low-latency HARQ-ACK bit group by 4, and the second information bit group in the low-latency signaling indicates whether the corresponding low-latency HARQ-ACK bit group includes the first HARQ-ACK bit group.

In one subembodiment, steps in box F0 and steps in box F1 cannot appear simultaneously.

In one subembodiment, steps in box F0 and steps in box F2 appear simultaneously, or do not appear simultaneously.

In one subembodiment, the L2 low-latency radio signal(s) contain(s) an uplink channel corresponding to the first HARQ-ACK information.

In one affiliated embodiment of the above subembodiment, the uplink channel corresponding to the first HARQ-ACK information is transmitted on a sPUSCH.

In one subembodiment, the first HARQ-ACK information contains a HARQ-ACK bit related to the first radio signal.

In one subembodiment, the L2 low-latency radio signal(s) correspond to L2 sPUSCH(s) on the physical layer.

In one subembodiment, the first HARQ-ACK information is transmitted over a given radio signal. The given radio signal is a radio signal other than the L2 low-latency radio signal(s).

In one affiliated embodiment of the above subembodiment, a physical layer channel corresponding to the given radio signal is a sPUCCH.

In one affiliated embodiment of the above subembodiment, a physical layer channel corresponding to the given radio signal is a PUCCH or PUSCH.

Embodiment 6

Figure 6:
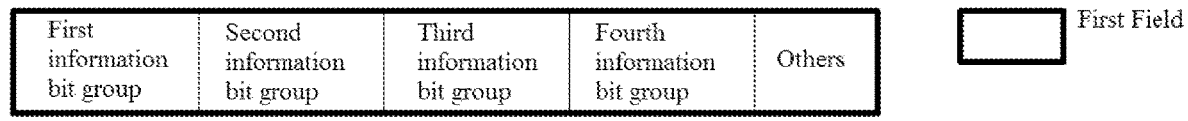
FIG. 6 is a diagram illustrating a first field according to one embodiment of the present application.

Embodiment 6 illustrates an example of a diagram of a first field according to the present application, as shown in FIG. 6. In FIG. 6, the first field includes a first information bit group, a second information bit group, a third information bit group and a fourth information bit group. The first information bit group, the second information bit group, the third information bit group and the fourth information bit group are composed of a positive integer number of information bits respectively. Others shown in FIG. 6 correspond to information bits other than the first information bit group, the second information bit group, the third information bit group and the fourth information bit group.

In one subembodiment, a given low-latency HARQ-ACK bit group is a low-latency HARQ-ACK bit group containing a given HARQ-ACK bit; and the given HARQ-ACK bit is a HARQ-ACK bit related to the first radio signal.

In one subembodiment, a first HARQ-ACK bit group contains a HARQ-ACK bit related to the first radio signal.

In one subembodiment, the given low-latency HARQ-ACK bit group corresponds to the first low-latency HARQ-ACK bit group defined in the present disclosure.

In one subembodiment, the first information bit group is used for determining the number of HARQ-ACK bits in the given low-latency HARQ-ACK bit group.

In one subembodiment, the second information bit group is used for determining whether the given low-latency HARQ-ACK bit group includes the first HARQ-ACK bit group.

In one affiliated embodiment of the above subembodiment, the second information bit group is equal to 1, and the given low-latency HARQ-ACK bit group includes all of the HARQ-ACK bits in the first HARQ-ACK bit group.

In one affiliated embodiment of the above subembodiment, the second information bit group is equal to 0, and the given low-latency HARQ-ACK bit group does not include any of the HARQ-ACK bits in the first HARQ-ACK bit group.

In one subembodiment, the third information bit group is used for determining the number of HARQ-ACK bits that belong to both the given low-latency HARQ-ACK bit group and the first HARQ-ACK bit group.

In one affiliated embodiment of the above subembodiment, the first HARQ-ACK bit group contains I1 HARQ-ACK bits, I2 HARQ-ACK bits among the I1 HARQ-ACK bits belong to the given low-latency HARQ-ACK bit group, and I3 HARQ-ACK bits among the I1 HARQ-ACK bits do not belong to the given low-latency HARQ-ACK bit group. The I1 is equal to the sum of the I2 and the I3, the I2 is a positive integer, and the I3 is a non-negative integer.

In one example of the affiliated embodiment, the fourth information bit group is used for determining the I2 HARQ-ACK bits from the I1 HARQ-ACK bits.

In one subembodiment, the number of the information bits corresponding to the Others is equal to 0.

Embodiment 7

Figure 7:
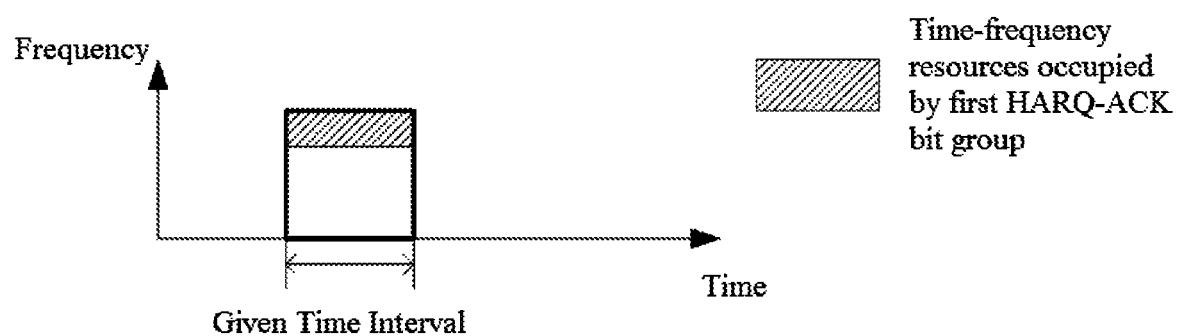
FIG. 7 is a diagram illustrating time-domain resources occupied by a first HARQ-ACK bit group according to one embodiment of the present application.

Embodiment 7 illustrates an example of a diagram of time-domain resources occupied by a first HARQ-ACK bit group according to the present application, as shown in FIG. 7. In FIG. 7, the first HARQ-ACK bit group occupies one given time interval only, and the given time interval has a duration less than 1 ms.

In one subembodiment, the transmission time interval of the downlink transmission corresponding to all the HARQ-ACK bits in the first HARQ-ACK bit group is one TTI.

In one subembodiment, the given time interval is used for the transmission of the first low-latency HARQ-ACK bit group in the present disclosure.

Embodiment 8

Figure 8:
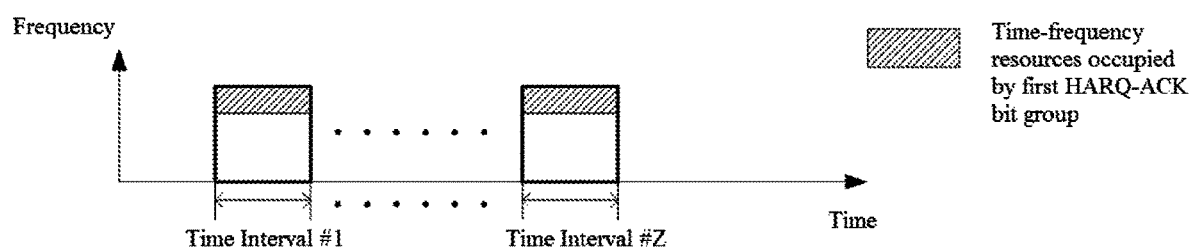
FIG. 8 is a diagram illustrating time-domain resources occupied by a first HARQ-ACK bit group according to another embodiment of the present application.

Embodiment 8 illustrates an example of a diagram of time-domain resources occupied by another first HARQ-ACK bit group according to the present application, as shown in FIG. 8. In FIG. 8, the first HARQ-ACK bit group occupies a positive integer number of time intervals, the positive integer number of time intervals correspond to a time interval #1, . . . , a time interval #Z respectively; and the Z is a positive integer greater than 1.

In one subembodiment, the positive integer number of time intervals are contiguous in time domain.

In one subembodiment, the positive integer number of time intervals are discrete in time domain.

In one subembodiment, the positive integer number of time intervals belong to one same subframe.

In one subembodiment, the first low-latency HARQ-ACK bit group is transmitted on one of the positive integer number of time intervals.

Embodiment 9

Figure 9:
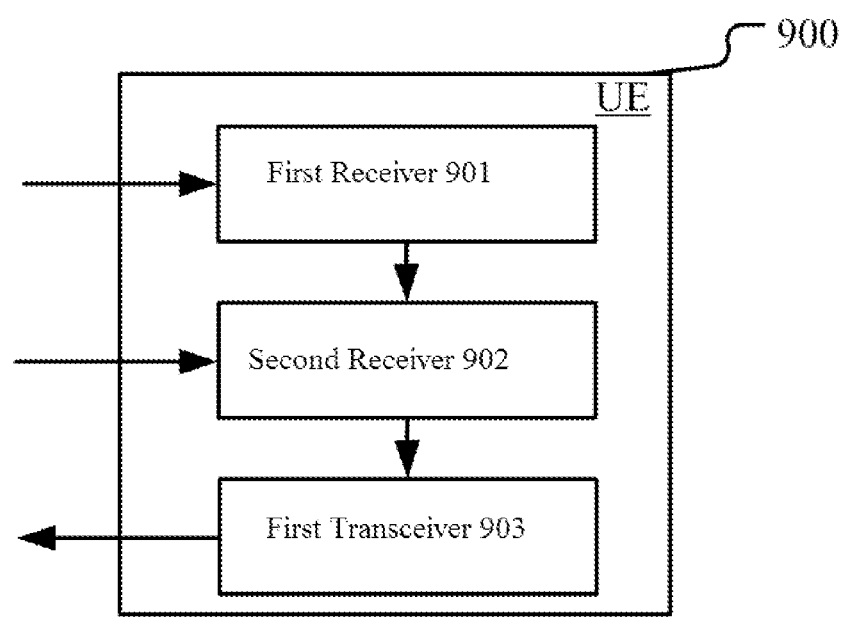
FIG. 9 is a structure block diagram illustrating a processing device in a UE according to one embodiment of the present application.

Embodiment 9 illustrates an example of a structure block diagram of a processing device in a UE, as shown in FIG. 9. In FIG. 9, the processing device 900 in the UE includes a first receiver 901, a second receiver 902 and a first transceiver 903.

The first receiver 901 receives a first radio signal.

The second receiver 902 detects a low-latency signaling in L1 time intervals respectively.

The first transceiver 903 transmits first HARQ-ACK information.

In Embodiment 9, the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded. The L1 is a positive integer.

In one subembodiment, the first receiver 901 receives a first signaling; the first signaling includes a DAI field, and the DAI field in the first signaling is used for determining the number of the HARQ-ACK bits in the first HARQ-ACK bit group.

In one subembodiment, the first transceiver 903 determines air-interface resources occupied by the first HARQ-ACK information according to an LTE scheme based on a 1 ms TTI; the first transceiver 903 detects no low-latency signaling in the L1 time intervals, the first HARQ-ACK information includes and only includes the first HARQ-ACK bit group, and the first radio signal corresponds to a TTI of 1 ms.

In one subembodiment, the first transceiver 903 transmits L2 low-latency radio signals; the L2 low-latency signalings include scheduling information of the L2 low-latency radio signals respectively, and the scheduling information includes at least one of occupied time-frequency resources, an MCS, an RV, an NDI and a HARQ process number.

In one subembodiment, at least one of the downlink data corresponding to the corresponding low-latency HARQ-ACK bit group corresponds to a sTTI.

In one subembodiment, the transmission time interval of the downlink data corresponding to the first HARQ-ACK bit group is one TTI, and the first HARQ-ACK bit group is composed of I1 HARQ-ACK bits.

In one affiliated embodiment of the above two subembodiments, I2 HARQ-ACK bits among the I1 HARQ-ACK bits belong to the corresponding low-latency HARQ-ACK bit group simultaneously.

In one example of the above affiliated embodiment, the I2 HARQ-ACK bits include a HARQ-ACK bit related to the first radio signal.

In one example of the above affiliated embodiment, the corresponding low-latency HARQ-ACK bit group further contains HARQ-ACK bits other than the I2 HARQ-ACK bits.

In one example of the above affiliated embodiment, the corresponding low-latency HARQ-ACK bit group contains and only contains the I2 HARQ-ACK bits.

In one example of the above affiliated embodiment, the first HARQ-ACK information at least contains a HARQ-ACK bit related to the first radio signal.

In one example of the above affiliated embodiment, the first HARQ-ACK information is used for conveying the corresponding low-latency HARQ-ACK bit group.

In one subembodiment, L2 low-latency signaling(s) is(are) correctly received in L2 time intervals respectively, the L2 time interval(s) is(are) a subset of the L1 time intervals, and the L2 is a positive integer, the L2 low-latency signaling(s) at least include(s) a first low-latency signaling, a first low-latency HARQ-ACK bit group corresponding to the first low-latency signaling includes the first HARQ-ACK bit group.

In one subembodiment, a first field in the first low-latency signaling is used for determining at least the former one of the number of HARQ-ACK bits in a first target HARQ-ACK bit group and positions of the HARQ-ACK bits contained in the first target HARQ-ACK bit group in the first HARQ-ACK bit group, and the first target HARQ-ACK bit group is composed of HARQ-ACK bits that belong to both the first low-latency HARQ-ACK bit group and the first HARQ-ACK bit group.

In one subembodiment, the first field includes at least a second information bit group among a first information bit group and the second information bit group; the first information bit group includes two information bits, and the second information bit group includes one information bit; a value of the first information bit group in the low-latency signaling is equal to a remainder left by dividing the number of the HARQ-ACK bits in the corresponding low-latency HARQ-ACK bit group by 4, and the second information bit group in the low-latency signaling indicates whether the corresponding low-latency HARQ-ACK bit group includes the first HARQ-ACK bit group.

In one subembodiment, the first HARQ-ACK bit group includes and only includes HARQ-ACK bits transmitted on a given physical layer channel determined according to the LTE scheme based on a 1 ms TTI.

In one subembodiment, the first receiver 901 includes at least the former two of the receiver 456, the receiving processor 452 and the controller/processor 490 mentioned in FIG. 4.

In one subembodiment, the second receiver 901 includes at least the former three of the receiver 456, the receiving processor 452, the HARQ processor 441 and the controller/processor 490 mentioned in FIG. 4.

In one subembodiment, the first transceiver 902 includes at least the former two of the transmitter 456, the transmitting processor 455, the receiver 456, the receiving processor 452 and the controller/processor 490 mentioned in FIG. 4.

Embodiment 10

Figure 10:
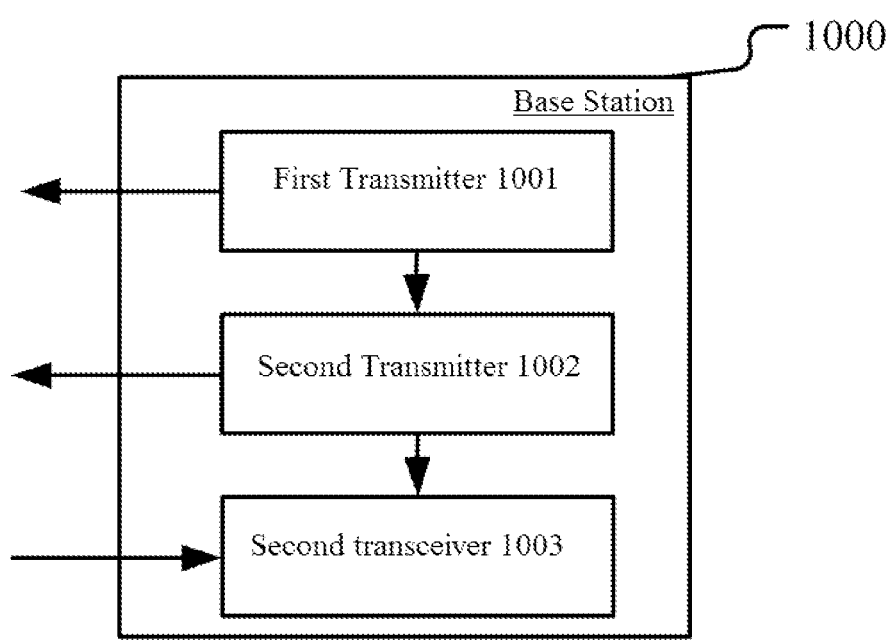
FIG. 10 is a structure block diagram illustrating a processing device in a base station according to one embodiment of the present application.

Embodiment 10 illustrates an example of a structure block diagram of a processing device in a base station, as shown in FIG. 10. In FIG. 10, the processing device 1000 in the base station includes a first transmitter 1001, a second transmitter 1002 and a second transceiver 1003.

The first transmitter 1001 transmits a first radio signal.

The second transmitter 1002 transmits a low-latency signaling in L1 time intervals.

The second transceiver 1003 receives first HARQ-ACK information.

In Embodiment 10, the low-latency signaling is a physical layer signaling, the low-latency signaling includes a first field, the first field in the low-latency signaling is used for determining at least the former one of whether a corresponding low-latency HARQ-ACK bit group includes a HARQ-ACK bit in a first HARQ-ACK bit group and the number of HARQ-ACK bits in the corresponding low-latency HARQ-ACK bit group; the first HARQ-ACK bit group includes a HARQ-ACK bit related to the first radio signal, the low-latency signaling is used for determining time-domain resources occupied by the corresponding low-latency HARQ-ACK bit group; the first HARQ-ACK information includes part or all of HARQ-ACK bits in the first HARQ-ACK bit group; the first HARQ-ACK information and the low-latency HARQ-ACK bit group each include a positive integer number of HARQ-ACK bits, and one HARQ-ACK bit indicates whether one downlink bit block is correctly decoded. The L1 is a positive integer.

In one embodiment, the first transmitter 1001 transmits a first signaling; the first signaling includes a DAI field, and the DAI field in the first signaling is used for determining the number of the HARQ-ACK bits in the first HARQ-ACK bit group.

In one embodiment, the second transceiver 1003 configures air-interface resources for the first HARQ-ACK information according to an LTE scheme based on a 1 ms TTI; wherein the second transceiver 1003 transmits no low-latency signaling in the L1 time intervals, the first HARQ-ACK information includes and only includes the first HARQ-ACK bit group, and the first radio signal corresponds to a TTI of 1 ms.

In one embodiment, the second transceiver 1003 receives L2 low-latency radio signals; the L2 low-latency signaling(s) include(s) scheduling information of the L2 low-latency radio signal(s) respectively, and the scheduling information includes at least one of occupied time-frequency resources, an MCS, an RV, an NDI and a HARQ process number.

In one subembodiment, at least one of the downlink data corresponding to the corresponding low-latency HARQ-ACK bit group corresponds to a sTTI.

In one subembodiment, the transmission time interval of the downlink data corresponding to the first HARQ-ACK bit group is one TTI, and the first HARQ-ACK bit group is composed of T1 HARQ-ACK bits.

In one affiliated embodiment of the above two subembodiments, I2 HARQ-ACK bits among the T1 HARQ-ACK bits belong to the corresponding low-latency HARQ-ACK bit group simultaneously.

In one example of the above affiliated embodiment, the I2 HARQ-ACK bits include a HARQ-ACK bit related to the first radio signal.

In one example of the above affiliated embodiment, the corresponding low-latency HARQ-ACK bit group further contains HARQ-ACK bits other than the I2 HARQ-ACK bits.

In one example of the above affiliated embodiment, the corresponding low-latency HARQ-ACK bit group contains and only contains the I2 HARQ-ACK bits.

In one example of the above affiliated embodiment, the first HARQ-ACK information at least contains a HARQ-ACK bit related to the first radio signal.

In one example of the above affiliated embodiment, the first HARQ-ACK information is used for conveying the corresponding low-latency HARQ-ACK bit group.

In one subembodiment, L2 low-latency signaling(s) is(are) correctly received in L2 time intervals respectively, the L2 time interval(s) is(are) a subset of the L1 time intervals, and the L2 is a positive integer, the L2 low-latency signaling(s) at least include(s) a first low-latency signaling, a first low-latency HARQ-ACK bit group corresponding to the first low-latency signaling includes the first HARQ-ACK bit group.

In one subembodiment, a first field in the first low-latency signaling is used for determining at least the former one of the number of HARQ-ACK bits in a first target HARQ-ACK bit group and positions of the HARQ-ACK bits contained in the first target HARQ-ACK bit group in the first HARQ-ACK bit group, and the first target HARQ-ACK bit group is composed of HARQ-ACK bits that belong to both the first low-latency HARQ-ACK bit group and the first HARQ-ACK bit group.

In one subembodiment, the first field includes at least a second information bit group among a first information bit group and the second information bit group; the first information bit group includes two information bits, and the second information bit group includes one information bit; a value of the first information bit group in the low-latency signaling is equal to a remainder left by dividing the number of the HARQ-ACK bits in the corresponding low-latency HARQ-ACK bit group by 4, and the second information bit group in the low-latency signaling indicates whether the corresponding low-latency HARQ-ACK bit group includes the first HARQ-ACK bit group.

In one subembodiment, the first HARQ-ACK bit group includes and only includes HARQ-ACK bits transmitted on a given physical layer channel determined according to the LTE scheme based on a 1 ms TTI.

In one subembodiment, the first transmitter 1001 includes at least the former two of the transmitter 416, the transmitting processor 415 and the controller/processor 440 mentioned in FIG. 4.

In one subembodiment, the second transmitter 1001 includes at least the former three of the transmitter 416, the transmitting processor 415, the HARQ processor 471 and the controller/processor 440 mentioned in FIG. 4.

In one subembodiment, the second transceiver 1002 includes at least the former two of the receiver 416, the receiving processor 412, the transmitter 416, the transmitting processor 415 and the controller/processor 440 mentioned in FIG. 4.

The ordinary skill in the art may understand that all or part of the steps in the above method may be implemented by instructing related hardware through a program. The program may be stored in a computer readable storage medium, for example Read-Only Memory (ROM), hard disk or compact disc, etc. Optionally, all or part of the steps in the above embodiments may also be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other wireless communication equipment. The base station in the present application includes but not limited to macro-cellular base stations, micro-cellular base stations, home base stations, relay base stations, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) supporting Hybrid Automatic Repeat request (HARQ), comprising:
receiving a first signaling and a first radio signal, the first signaling includes scheduling information of the first radio signal, the scheduling information includes at least one of occupied time-frequency resources, a Modulation and Coding Scheme (MC S), a Redundancy Version (RV), a New Data Indicator (NDI) and a HARQ process number;
detecting a low-latency signaling in L1 time intervals respectively; and
transmitting first low-latency HARQ-ACK bit group;
wherein the first signaling is transmitted before the L1 time intervals, the low-latency signaling is a physical layer signaling, the low-latency signaling comprises a first field, the first field in the low-latency signaling is used for determining at least the former one of whether a corresponding low-latency HARQ-ACK bit group comprises a HARQ-ACK bit in a first HARQ-ACK bit group and the number of HARQ-ACK bits in the corresponding low-latency HARQ-ACK bit group; the first HARQ-ACK bit group comprises a HARQ-ACK bit related to the first radio signal, the low-latency signaling is used for determining time-domain resources occupied by the corresponding low-latency HARQ-ACK bit group; the low-latency HARQ-ACK bit group each comprise a positive integer number of HARQ-ACK bits, and one HARQ-ACK bit indicates whether one downlink bit block is correctly decoded; L2 low-latency signaling(s) is(are) correctly received in L2 time intervals respectively, the L2 time interval(s) is(are) a subset of the L1 time intervals, and the L2 is a positive integer, the L2 low-latency signaling(s) at least include(s) a first low-latency signaling, the first low-latency HARQ-ACK bit group corresponding to the first low-latency signaling includes the first HARQ-ACK bit group; the L1 is a positive integer that is greater than 1; time-domain resources occupied by the first radio signal are not later than any one of the L1 time intervals; the first radio signal is transmitted on a Physical Downlink Shared Channel; the first signaling comprises a Downlink Assignment Index (DAI) field, and the DAI field in the first signaling is used for determining the number of the HARQ-ACK bits in the first HARQ-ACK bit group; the low-latency signaling indicates explicitly time-domain resources occupied by the corresponding low-latency HARQ-ACK bit group.

2. The method according to claim 1, wherein a first field in the first low-latency signaling is used for determining the number of HARQ-ACK bits in the first HARQ-ACK bit group.

3. The method according to claim 2, wherein the first field comprises at least a second information bit group among a first information bit group and the second information bit group; the first information bit group comprises two information bits, and the second information bit group comprises one information bit; the first information bit group in the low-latency signaling is used to determine the number of the HARQ-ACK bits in the corresponding low-latency HARQ-ACK bit group, and the second information bit group in the low-latency signaling indicates whether the corresponding low-latency HARQ-ACK bit group comprises the first HARQ-ACK bit group.

4. The method according to claim 3, when the second information bit group is equal to 1, and the corresponding low-latency HARQ-ACK bit group includes all of the HARQ-ACK bits in the first HARQ-ACK bit group; when the second information bit group is equal to 0, and the corresponding low-latency HARQ-ACK bit group does not include any of the HARQ-ACK bits in the first HARQ-ACK bit group.

5. The method according to claim 1, wherein the first radio signal includes F1 downlink bit blocks, the F1 downlink bit blocks are transmitted in F1 subframes respectively, and the F1 is a positive integer greater than 1, or, the first radio signal includes F2 downlink bit blocks, the F2 downlink bit blocks are transmitted on F2 carriers respectively, and the F2 is a positive integer greater than 1.

6. The method according to claim 3, wherein the low-latency signaling includes a given information field, an end time of the time interval occupied by the low-latency signaling is T1 millisecond, and a start time of the time-domain resource occupied by the corresponding low-latency HARQ-ACK bit group is T1+T2 millisecond, the given information field is used for determining the T2, and the given information field is an information field in the low-latency signaling; the T2 is a positive integer multiple of 14*T, the time interval has a duration equal to 14*T; the T is a duration of a time window occupied by one multicarrier symbol.

7. A method in a base station supporting HARQ, comprising:
transmitting a first signaling and a first radio signal, the first signaling includes scheduling information of the first radio signal, the scheduling information includes at least one of occupied time-frequency resources, a Modulation and Coding Scheme (MCS), a Redundancy Version (RV), a New Data Indicator (NDI) and a HARQ process number;

transmitting a low-latency signaling in L1 time intervals; and receiving first low-latency HARQ-ACK bit group;

wherein the first signaling is transmitted before the L1 time intervals, the low-latency signaling is a physical layer signaling, the low-latency signaling comprises a first field, the first field in the low-latency signaling is used for determining at least the former one of whether a corresponding low-latency HARQ-ACK bit group comprises a HARQ-ACK bit in a first HARQ-ACK bit group and the number of HARQ-ACK bits in the corresponding low-latency HARQ-ACK bit group; the first HARQ-ACK bit group comprises a HARQ-ACK bit related to the first radio signal, the low-latency signaling is used for determining time-domain resources occupied by the corresponding low-latency HARQ-ACK bit group; the low-latency HARQ-ACK bit group each comprise a positive integer number of HARQ-ACK bits, and one HARQ-ACK bit indicates whether one downlink bit block is correctly decoded; L2 low-latency signaling(s) is(are) transmitted in L2 time intervals respectively, the L2 time interval(s) is(are) a subset of the L1 time intervals, and the L2 is a positive integer, the L2 low-latency signaling(s) at least include(s) a first low-latency signaling, the first low-latency HARQ-ACK bit group corresponding to the first low-latency signaling includes the first HARQ-ACK bit group; the L1 is a positive integer that is greater than 1; time-domain resources occupied by the first radio signal are not later than any one of the L1 time intervals; the first radio signal is transmitted on a Physical Downlink Shared Channel; the first signaling comprises a Downlink Assignment Index (DAI) field, and the DAI field in the first signaling is used for determining the number of the HARQ-ACK bits in the first HARQ-ACK bit group; the low-latency signaling indicates explicitly time-domain resources occupied by the corresponding low-latency HARQ-ACK bit group; a first field in the first low-latency signaling is used for determining the number of HARQ-ACK bits in the first HARQ-ACK bit group.

8. The method according to claim 7, wherein the first field comprises at least a second information bit group among a first information bit group and the second information bit group; the first information bit group comprises two information bits, and the second information bit group comprises one information bit; the first information bit group in the low-latency signaling is used to determine the number of the HARQ-ACK bits in the corresponding low-latency HARQ-ACK bit group, and the second information bit group in the low-latency signaling indicates whether the corresponding low-latency HARQ-ACK bit group comprises the first HARQ-ACK bit group.

9. The method according to claim 8, when the second information bit group is equal to 1, and the corresponding low-latency HARQ-ACK bit group includes all of the HARQ-ACK bits in the first HARQ-ACK bit group; when the second information bit group is equal to 0, and the corresponding low-latency HARQ-ACK bit group does not include any of the HARQ-ACK bits in the first HARQ-ACK bit group.

10. The method according to claim 7, wherein the first radio signal includes F1 downlink bit blocks, the F1 downlink bit blocks are transmitted in F1 subframes respectively, and the F1 is a positive integer greater than 1, or, the first radio signal includes F2 downlink bit blocks, the F2 downlink bit blocks are transmitted on F2 carriers respectively, and the F2 is a positive integer greater than 1.

11. A UE supporting HARQ, comprising:

a first receiver, to receive a first signaling and a first radio signal, the first signaling includes scheduling information of the first radio signal, the scheduling information includes at least one of occupied time-frequency resources, a Modulation and Coding Scheme (MCS), a Redundancy Version (RV), a New Data Indicator (NDI) and a HARQ process number;

a second receiver, to detect a low-latency signaling in L1 time intervals respectively; and a first transceiver, to transmit first low-latency HARQ-ACK bit group;

wherein the first signaling is transmitted before the L1 time intervals, the low-latency signaling is a physical layer signaling, the low-latency signaling comprises a first field, the first field in the low-latency signaling is used for determining at least the former one of whether a corresponding low-latency HARQ-ACK bit group comprises a HARQ-ACK bit in a first HARQ-ACK bit group and the number of HARQ-ACK bits in the corresponding low-latency HARQ-ACK bit group; the first HARQ-ACK bit group comprises a HARQ-ACK bit related to the first radio signal, the low-latency signaling is used for determining time-domain resources occupied by the corresponding low-latency HARQ-ACK bit group; the low-latency HARQ-ACK bit group each comprise a positive integer number of HARQ-ACK bits, and one HARQ-ACK bit indicates whether one downlink bit block is correctly decoded; the L1 is a positive integer that is greater than 1; L2 low-latency signaling(s) is(are) correctly received in L2 time intervals respectively, the L2 time interval(s) is(are) a subset of the L1 time intervals, and the L2 is a positive integer, the L2 low-latency signaling(s) at least include(s) a first low-latency signaling, the first low-latency HARQ-ACK bit group corresponding to the first low-latency signaling includes the first HARQ-ACK bit group; time-domain resources occupied by the first radio signal are not later than any one of the L1 time intervals; the first radio signal is transmitted on a Physical Downlink Shared Channel; the first signaling comprises a Downlink Assignment Index (DAI) field, and the DAI field in the first signaling is used for determining the number of the HARQ-ACK bits in the first HARQ-ACK bit group; the low-latency signaling indicates explicitly time-domain resources occupied by the corresponding low-latency HARQ-ACK bit group.

12. The UE according to claim 11, wherein a first field in the first low-latency signaling is used for determining the number of HARQ-ACK bits in the first HARQ-ACK bit group.

13. The UE according to claim 12, wherein the first field comprises at least a second information bit group among a first information bit group and the second information bit group; the first information bit group comprises two information bits, and the second information bit group comprises one information bit; the first information bit group in the low-latency signaling is used to determine the number of the HARQ-ACK bits in the corresponding low-latency HARQ-ACK bit group, and the second information bit group in the low-latency signaling indicates whether the corresponding low-latency HARQ-ACK bit group comprises the first HARQ-ACK bit group.

14. The UE according to claim 13, when the second information bit group is equal to 1, and the corresponding low-latency HARQ-ACK bit group includes all of the HARQ-ACK bits in the first HARQ-ACK bit group; when the second information bit group is equal to 0, and the corresponding low-latency HARQ-ACK bit group does not include any of the HARQ-ACK bits in the first HARQ-ACK bit group.

15. The UE according to claim 13, wherein the first radio signal includes F1 downlink bit blocks, the F1 downlink bit blocks are transmitted in F1 subframes respectively, and the F1 is a positive integer greater than 1, or, the first radio signal includes F2 downlink bit blocks, the F2 downlink bit blocks are transmitted on F2 carriers respectively, and the F2 is a positive integer greater than 1.

16. The UE according to claim 12, wherein the low-latency signaling includes a given information field, an end time of the time interval occupied by the low-latency signaling is T1 millisecond, and a start time of the time-domain resource occupied by the corresponding low-latency HARQ-ACK bit group is T1+T2 millisecond, the given information field is used for determining the T2, and the given information field is an information field in the low-latency signaling; the T2 is a positive integer multiple of 14*T, the time interval has a duration equal to 14*T; the T is a duration of a time window occupied by one multicarrier symbol.

17. A base station supporting HARQ, comprising:
a first transmitter, to transmit a first signaling and a first radio signal, the first signaling includes scheduling information of the first radio signal, the scheduling information includes at least one of occupied time-frequency resources, a Modulation and Coding Scheme (MCS), a Redundancy Version (RV), a New Data Indicator (NDI) and a HARQ process number;
a second transmitter, to transmit a low-latency signaling in L1 time intervals; and
a second transceiver, to receive first low-latency HARQ-ACK bit group;
wherein the first signaling is transmitted before the L1 time intervals, the low-latency signaling is a physical layer signaling, the low-latency signaling comprises a first field, the first field in the low-latency signaling is used for determining at least the former one of whether a corresponding low-latency HARQ-ACK bit group comprises a HARQ-ACK bit in a first HARQ-ACK bit group and the number of HARQ-ACK bits in the corresponding low-latency HARQ-ACK bit group; the first HARQ-ACK bit group comprises a HARQ-ACK bit related to the first radio signal, the low-latency signaling is used for determining time-domain resources occupied by the corresponding low-latency HARQ-ACK bit group; the low-latency HARQ-ACK bit group each comprise a positive integer number of HARQ-ACK bits, and one HARQ-ACK bit indicates whether one downlink bit block is correctly decoded; the L1 is a positive integer that is greater than 1; L2 low-latency signaling(s) is(are) transmitted in L2 time intervals respectively, the L2 time interval(s) is(are) a subset of the L1 time intervals, and the L2 is a positive integer, the L2 low-latency signaling(s) at least include(s) a first low-latency signaling, the first low-latency HARQ-ACK bit group corresponding to the first low-latency signaling includes the first HARQ-ACK bit group; time-domain resources occupied by the first radio signal are not later than any one of the L1 time intervals; the first radio signal is transmitted on a Physical Downlink Shared Channel; the first signaling comprises a Downlink Assignment Index (DAI) field, and the DAI field in the first signaling is used for determining the number of the HARQ-ACK bits in the first HARQ-ACK bit group; the low-latency signaling indicates explicitly time-domain resources occupied by the corresponding low-latency HARQ-ACK bit group; a first field in the first low-latency signaling is used for determining the number of HARQ-ACK bits in the first HARQ-ACK bit group.

18. The base station according to claim 17, wherein the first field comprises at least a second information bit group among a first information bit group and the second information bit group; the first information bit group comprises two information bits, and the second information bit group comprises one information bit; the first information bit group in the low-latency signaling is used to determine the number of the HARQ-ACK bits in the corresponding low-latency HARQ-ACK bit group, and the second information bit group in the low-latency signaling indicates whether the corresponding low-latency HARQ-ACK bit group comprises the first HARQ-ACK bit group.

19. The base station according to claim 18, when the second information bit group is equal to 1, and the corresponding low-latency HARQ-ACK bit group includes all of the HARQ-ACK bits in the first HARQ-ACK bit group; when the second information bit group is equal to 0, and the corresponding low-latency HARQ-ACK bit group does not include any of the HARQ-ACK bits in the first HARQ-ACK bit group.

20. The base station according to claim 17, wherein the first radio signal includes F1 downlink bit blocks, the F1 downlink bit blocks are transmitted in F1 subframes respectively, and the F1 is a positive integer greater than 1, or, the first radio signal includes F2 downlink bit blocks, the F2 downlink bit blocks are transmitted on F2 carriers respectively, and the F2 is a positive integer greater than 1.

* * * * *